(12) United States Patent
Sasaki et al.

(10) Patent No.: US 6,313,184 B1
(45) Date of Patent: Nov. 6, 2001

(54) EXPANDED POLYPROPYLENE RESIN BEADS AND A MOLDED ARTICLE

(75) Inventors: Hidehiro Sasaki, Kawachi-gun; Masakazu Sakaguchi, Kanuma; Mitsuhiro Akiyama, Hiratsuka; Hisao Tokoro, Utsunomiya, all of (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 09/554,510

(22) PCT Filed: Dec. 1, 1998

(86) PCT No.: PCT/JP98/05414

§ 371 Date: May 17, 2000

§ 102(e) Date: May 17, 2000

(87) PCT Pub. No.: WO99/28374

PCT Pub. Date: Jun. 10, 1999

(30) Foreign Application Priority Data

Dec. 1, 1997 (JP) .................................................. 9-345912

(51) Int. Cl.$^7$ ........................................................ C08J 9/00
(52) U.S. Cl. ................................ 521/56; 521/59; 521/60; 521/142; 521/143; 521/144
(58) Field of Search ................................ 521/60, 59, 56, 521/142, 143, 144

(56) References Cited

U.S. PATENT DOCUMENTS

| | | |
|---|---|---|
| Re. 32,780 | 11/1988 | Yoshimura et al. . |
| 4,379,859 | 4/1983 | Hirosawa et al. . |
| 4,436,840 | 3/1984 | Akiyama et al. . |
| 4,440,703 | 4/1984 | Akiyama et al. . |
| 4,443,393 | 4/1984 | Akiyama et al. . |
| 4,464,484 | 8/1984 | Yoshimura et al. . |
| 4,504,534 | 3/1985 | Adachi et al. . |
| 4,504,601 | 3/1985 | Kuwabara et al. . |
| 4,567,208 | 1/1986 | Kuwabara et al. . |
| 4,568,608 | 2/1986 | Kuwabara et al. . |
| 4,587,270 | 5/1986 | Kuwabara et al. . |
| 4,598,001 | 7/1986 | Watanabe et al. . |
| 4,602,082 | 7/1986 | Akiyama et al. . |
| 4,676,939 | 6/1987 | Kuwabara . |
| 4,692,507 | 9/1987 | Akiyama et al. . |
| 4,695,593 | 9/1987 | Kuwabara et al. . |
| 4,704,239 | 11/1987 | Yoshimura et al. . |
| 4,711,287 | 12/1987 | Kuwabara et al. . |
| 4,716,021 | 12/1987 | Akiyama et al. . |
| 4,749,725 | 6/1988 | Akiyama et al. . |
| 4,756,948 | 7/1988 | Kuramochi et al. . |
| 4,777,000 | 10/1988 | Kuwabara et al. . |
| 4,822,542 | 4/1989 | Kuwabara et al. . |
| 4,840,973 | 6/1989 | Kuwabara et al. . |
| 4,889,671 | 12/1989 | Akiyama et al. . |
| 4,948,817 | 8/1990 | Kuwabara et al. . |
| 5,053,435 | 10/1991 | Kuwabara et al. . |
| 5,071,883 | 12/1991 | Kuwabara et al. . |
| 5,085,814 | 2/1992 | Kamiyama et al. . |
| 5,122,545 | 6/1992 | Kuwabara et al. . |
| 5,130,341 | 7/1992 | Kuwabara et al. . |
| 5,284,431 | 2/1994 | Kuwabara et al. . |
| 5,340,841 | 8/1994 | Tokoro et al. . |
| 5,391,581 | 2/1995 | Kuwabara et al. . |
| 5,459,169 | 10/1995 | Tokoro et al. . |
| 5,468,781 | 11/1995 | Sugano et al. . |
| 5,569,681 | 10/1996 | Tokoro et al. . |
| 5,622,756 | 4/1997 | Tokoro et al. . |
| 5,651,912 | 7/1997 | Mitsumoto et al. . |
| 5,679,450 | 10/1997 | Tokoro et al. . |
| 5,747,549 | 5/1998 | Tsurugai et al. . |
| 5,928,776 | 7/1999 | Shioya et al. . |
| 5,968,430 | 10/1999 | Naito et al. . |
| 6,034,144 | 3/2000 | Shioya et al. . |
| 6,077,875 | 6/2000 | Sasaki et al. . |

FOREIGN PATENT DOCUMENTS

| | | |
|---|---|---|
| 0068467 | 1/1983 | (EP) . |
| 0071981 | 2/1983 | (EP) . |

OTHER PUBLICATIONS

JP 4–224832 A (Mitsui Toatsu Chemicals, Inc.), Aug. 14, 1992, Abstract.

*Primary Examiner*—Morton Foelak (57) ABSTRACT

Propylene resin beads for molding expansion molded articles having improved high temperature resistance include as base resin metallocene-catalyzed copolymers of propylene with at least one or more of ethylene and -olefins of 4 to 20 carbon atoms. The metallocene-catalyzed propylene copolymers are isotactic random copolymers characterized by a melting point higher than 140° C. to 160° C. and a melt flow rate (MFR) of not higher than 12 g/10 minutes, especially, 0.5 to 12 g/10 minutes. Expansion molded articles produced by expansion molding the expanded beads have a high temperature degree of deflection which is lower than that of metallocene-catalyzed propylene homopolymers and lower than that of Ziegler-Natta-catalyzed random propylene copolymers having the same comonomers and melting point.

21 Claims, 4 Drawing Sheets

EXPANDED POLYPROPYLENE RESIN BEADS AND A MOLDED ARTICLE

CROSS-REFERENCE TO RELATED APPLICATION

This application is the National Phase entry, 35 USC 371, of International PCT application, PCT/JP98/05414, filed Dec. 1, 1998, and designating the United States.

TECHNICAL FIELD

This invention relates to expanded polypropylene resin beads and also to molded articles obtained by molding the expanded beads in a mold.

TECHNICAL BACKGROUND

The molded article obtained by molding expanded polypropylene resin beads in a mold is excellent in resistance to chemicals, impact resistance, recovery properties of compression stress and the like, for which they have been hitherto widely employed as a shock-absorbing material such as a cushioning material or a core material for bumper.

Conventionally, ordinarily employed polypropylene resins are usually ones, which are obtained by polymerization by use of the Ziegler-Natta catalyst. In recent years, it has been found that those resins prepared by use of a metallocene polymerization catalyst have a melting point lower than that of the polypropylene resin polymerized by use of the Ziegler-Natta catalyst, so that the resultant expanded beads can be molded at a lower steam pressure, and a cell diameter can be made uniform. Thus, there has been proposed the manufacture of a molded article from the expanded beads which make use, as a base resin, of the polypropylene resin polymerized by use of a metallocene polymerization catalyst (Japanese Patent Application Laid-open No. Hei 6-240041).

The present applicant has paid attention to the characteristic properties of the polypropylene resin polymerized by use of a metallocene polymerization catalyst as mentioned above. As a result, it has been found that when homopolypropylenes, which have a problem on moldability, are obtained by polymerization with use of a metallocene polymerization catalyst and, among them, a specific type of homopolypropylene exhibiting specified physical properties is used as a base resin, a molded article can be produced with good moldability by subjecting expanded beads of the homopolypropylene to molding. In addition, the thus produced molded article is more excellent in rigidity, in terms of a compression strain or the like, than prior art counterparts, with an energy absorption efficiency being fully satisfactory. An earlier application based on this finding was filed (as Japanese Patent Application No. Hei 8-229289).

However, a homopolypropylene resin is generally poor in impact resistance at low temperatures, and a resin obtained by copolymerization with a small amount of ethylene or an α-olefin having four or more carbon atoms should be preferably used as the polypropylene resin. Commercially available homopolypropylene resins, which are obtained by polymerization with use of a metallocene polymerization catalyst, have, at most, a melting point of approximately 150° C., which is lower by 10° C. or over than that of an ordinary homopolypropylene resin polymerized by use of the Ziegler-Natta catalyst. In addition, a copolymer, which is prepared by random copolymerization of propylene with a small amount of ethylene or the like by use of a metallocene polymerization catalyst, lowers the rate of melting point as an amount of ethylene increases with the attendant problem that the molded article obtained from the resultant expanded beads significantly lowers in heat resistance.

Under these circumstances in the art, we have made intensive studies. As a result, it has been unexpectedly found that a molded article obtained from expanded beads using, as a base resin, a copolymer satisfying specified conditions and selected among random copolymers, which are obtained by using, as other comonomer component, one, or two or more in admixture of the comonomers selected from the group consisting of ethylene and α-olefins having four or more carbon atoms, and copolymerizing them with propylene by use of a metallocene polymerization catalyst, exhibits a higher heat resistance than a molded article of expanded beads composed of a propylene random copolymer, which exhibits substantially the same melting point as the first-mentioned copolymer, is polymerized by use of a metallocene polymerization catalyst and has a high melt flow rate. The invention has been accomplished based on the above finding.

The invention has its object for providing expanded beads of a polypropylene resin, which have good moldability.

The invention has another object for providing a molded article obtained by molding such expanded beads as mentioned above in a mold.

The invention has as its further object for providing a molded article, which has an excellent heat resistance in spite of the fact that the molded article makes use, as a base resin, of a copolymer obtained by random copolymerization of ethylene or the like with propylene by use of a metallocene polymerization catalyst.

DISCLOSURE OF THE INVENTION

The invention provides expanded beads for which there is used, as a base resin, a random copolymer obtained by copolymerizing propylene and one, or two or more in admixture of comonomers selected from the group consisting of ethylene and α-olefins having four or more carbon atoms by use of a metallocene polymerization catalyst. The expanded beads of the invention are mainly composed of an isotactic polypropylene resin, and the base resin has a melting point exceeding 140° C. and a melt flow rate of 12 g/10 minutes or below.

The copolymers other than propylene in the random copolymer is one, or two or more in admixture of comonomers selected from the group consisting of ethylene and α-olefins having four or more carbon atoms. Examples of the α-olefins having four or more carbon atoms include 1-butene, 1-pentene, 1-hexene, 4-methyl-1-pentene and the like. The content of one, or two or more in admixture of comonomers selected from the group consisting of ethylene and α-olefins having four or more carbon atoms in the random copolymer should preferably be in the range of 0.05~15 wt %.

Preferably, the expanded beads of the invention have a crystal structure which exhibits an inherent peak and a high temperature peak as an endothermic peak of the DSC curve obtained by subjecting the expanded beads to measurement by differential scanning calorimetry, and a heat quantity at the high temperature peak should be at 10 J/g or over.

The second embodiment of the invention disclosed herein consists in a molded article obtained by using the polypropylene resin beads and subjecting them to molding.

It is preferred that the molded article of the invention has a crystal structure wherein there appear an inherent peak and a high temperature peak as an endothermic peak of the DSC curve obtained by measuring the expanded beads by differential scanning calorimetry, and the high temperature peak has a quantity of heat of 10 J/g or over. Moreover, the density of the molded article should preferably be 0.040 g/cm$^3$ or over.

The expanded polypropylene resin beads of the invention have good moldability, and the molded article obtained from the expanded beads has a smaller degree of depression or deflection under a load at a high temperature and a better heat resistance than the molded article of expanded beads made of a propylene random copolymer, which has substantially the same melting point, is polymerized by use of a metallocene polymerization catalyst and has a high melt flow rate value, or the molded article of expanded beads made of a propylene random copolymer, which is polymerized by use of a propylene random copolymer, which is polymerized by use of the Ziegler-Natta catalyst and has the same melting point.

BEST MODE FOR CARRYING OUT THE INVENTION

The invention is now described in more detail.

The expanded polypropylene resin beads of the invention are made of an isotactic polypropylene resin, which consists of a random copolymer (hereinafter referred to as metallocene PP copolymer) obtained by copolymerizing propylene and one, or two or more in admixture of comonomers selected from the group consisting of ethylene and α-olefins having four or more carbon atoms by use of a metallocene polymerization catalyst and which has a melting point (hereinafter referred to as melting point Tm) exceeding 140° C. and a melt flow rate of 12 g/10 minutes or over.

In the practice of the invention, the metallocene copolymerization catalyst used to obtain the metallocene PP copolymer consists of a transition metal complex salt component having a metallocene structure and a co-catalyst component such as aluminoxane, a Lewis acid or an ionic compound.

The transition metal complex salt component has such a structure that two conjugated five-membered ring groups $C_5H_{5-m}R^1_m$ and $C_5H_{5-n}R^2_n$ are crosslinked via a crosslinking group Q, in which a transition metal compound MeXY is coordinated, and is represented by the following general formula (1) wherein m and n are, respectively, such an integer that $0 \leq m \leq 4$ and $0 \leq n \leq 4$ $$Q(C_5H_{4-m}R^1_m)(C_5H_{4-n}R^2_n)MeXY \qquad (1)$$

The conjugated five-membered rings $C_5H_{4-m}R^1_m$ and $C_5H_{4-n}R^2_n$ may be the same or different. When m (or n)=0, the conjugated five-membered ring consists of a cyclopentadienyl group. $R^1$ and $R^2$, which are, respectively, replaced to the conjugated five-membered rings, may be the same or different. When one conjugated five-membered ring has a plurality of substituents $R^1$ (or $R^2$), these $R^1$'s (or $R^2$'s) may be the same or different.

The substituents $R^1$, $R^2$ include a hydrocarbon group, a halogen, and an alkoxy group. The hydrocarbon group may contain silicon, phosphorus, nitrogen, boron and the like. The hydrocarbon group may be a monovalent substituent group or may be a divalent substituent group which forms a ring in combination with the conjugated five-membered ring. More particularly, the conjugated five-membered ring used herein encompasses within its scope an indenyl group or a fluorenyl group wherein a condensation group sharing the double bond with the conjugated five-membered ring, such as a pentadienyl group or the like, is formed.

The crosslinking group Q serving to crosslink the two conjugated five-membered rings include an alkylene group such as a methylene group, an ethylene group, an isopropylene group, a phenylmethylene group, a diphenylmethylene group or the like, a cycloalkylene group such as a cyclohexylene group, a silylene group, such as a silylene group, a dimethylsilylene group, a phenylmethylsilylene group, a diphenylsilylene group, a disilylene group, a tetramethyldisilylene group or the like, a hydrocarbon group containing germanium, phosphorus, nitrogen, boron or aluminium, or the like.

In the transition metal compound MeXY, Me is a transition metal of Groups IVB~VIB of the periodic table. Preferable examples of the transition metal include titanium, zirconium and hafnium. X and Y chemically bonded to the transition metal Me include a hydrogen, a halogen, a hydrocarbon group, an alkoxy group, an amino group, an alkylamino group or the like. The hydrocarbon group may contain phosphorus or silicon. X and Y may be the same or different.

The transition metal complex salt components include those wherein a conjugated five-membered ring is crosslinked with an alkylene group, e.g., ethylene bis(2-methylindenyl)zirconium dichloride, ethylene bis(2-methyl-4,5,6,7-tetrahydroindenyl)zirconium dichloride, ethylene bis(2,4-dimethylindenyl)zirconium dichloride, ethylene bis (2,4-dimethyl-4-hydroazurenyl)zirconium dichloride, ethylene bis(4,5,6,7-tetrahydroindenyl)hafnium dichloride and the like, and those wherein a conjugated five-membered ring is crosslinked with a silylene group, e.g., dimethylsilylene bis(4,5,6,7-tetrahydroindenyl)zirconium dichloride, dimethylsilylene bis(2-methylindenyl)zirconium dichloride, dimethylsilylene bis(2-methyl-4,5,6,7-tetrahydroindenyl) zirconium dichloride, dimethylsilylene bis(2,4-dimethylindenyl)zirconium dichloride, dimethylsilylene bis(2,4-dimethyl-4-hydroazurenyl)zirconium dichloride and the like.

The co-catalyst component includes, for example, aluminoxane, such as methylaluminoxane, isobutyl aluminoxane, methylisobutyl aluminoxane and the like, Lewis acids such as triphenylboron, tris(pentafluorophenyl) boron, magnesium chloride and the like, ionic compounds such as dimethylanilinium tetrakis (pentafluorophenyl) boron, triphenylcarbinium tetrakis (pentafluorophenyl) boron and the like. These co-catalyst components may be used in combination with organoaluminum compounds such as trimethylaluminum, triethylaluminum, triisobutylaluminum and the like.

In the practice of the invention, such metallocene polymerization catalyst is used to provide, as a base resin, a metallocene PP copolymer, which is obtained by subjecting propylene and one, or two or more in admixture of comonomers selected from the group consisting of ethylene and α-olefins having four or more carbon atoms to random copolymerization. Examples of the α-olefins having four or more carbon atoms include 1-butene, 1-pentene, 1-hexene, 4-methyl-1-pentene and the like. Thus, in the invention, the comonomers other than propylene including ethylene, 1-butene, 1-pentene, 1-hexene, 4-methyl-1-pentene and the like are used singly or in two or more admixture. In the practice of the invention, the content of one, or two or more in admixture (hereinafter referred to as comonomer component) of comonomers selected from the group consisting of ethylene and α-olefins having four or more carbon atoms in the copolymer should preferably be in the range of 0.05~15 wt %, more preferably 0.1~10 wt %. The metallocene PP copolymer, in which the comonomer component is appropriately copolymerized under such polymerization conditions as to ensure such a content as defined above, is used in the invention. If the content of the comonomer component in the copolymer is less than the above range, the cold-resistance of the resultant molded article lowers considerably. On the other hand, when the content exceeds the above range, it becomes difficult to make the melting point Tm at a level 140° C. or over, thus leading to the significant lowering of a heat resistance. The expanded beads of the polypropylene resin used in the invention consist of the metallocene PP copolymer containing the comonomer component within the above-defined range. However, it is not sufficient to achieve the effect of the invention. More particularly, the metallocene PP copolymer used in the invention should simultaneously satisfy, aside from the above-stated requirements, other requirements that the melting point Tm exceeds 140° C. and the melt flow rate (MFR) is not larger than 12 g/10 minutes.

The metallocene PP copolymer whose melting point Tm is 140° C. or less is liable to suffer depression or deflection under a load at a high temperature when a molded article is formed of expanded beads using the copolymer as a base resin. Thus, an absolute heat resistance becomes poor, and such a copolymer is unsatisfactory for improving the heat resistance of the molded article. When the melting point Tm exceeds 140° C. and the melt flow rate (MFR) exceeds 12 g/10 minutes, the heat resistance of the resultant molded article cannot be improved.

Taking into account the productivity and facility cost at the time of molding of the expanded polypropylene resin beads, the melting point Tm of the metallocene PP copolymer should preferably be at 160° C. or less, more preferably 141~155° C. In order not to lower the expansion efficiency at the time of the manufacture of expanded beads, the melt flow rate (MFR) should preferably be at 0.5 g/10 minutes or over, more preferably 4~10 g/10 minutes.

The expanded polypropylene resin beads of the invention made of the metallocene PP copolymer may be produced, for example, by melt-kneading a metallocene PP copolymer by means of an extruder, extruding it in the form of a strand, and cutting the strand into a given length after cooling or cooling after cutting into a given length, thereby obtaining pellet-shaped resin beads. Next, the resin beads are dispersed in a dispersion medium in the presence of a foaming agent within a closed vessel. If necessary, a dispersing agent is added to the dispersion medium, followed by heating the resin beads to a temperature not lower than the softening temperature of the resin beads to cause the foaming agent to be impregnated therein. Subsequently, the vessel is opened at one end thereof, and the resin beads and the dispersion medium are both released into an atmosphere of a pressure (usually, an atmospheric pressure) lower than that within the vessel while keeping the vessel pressure at a level not lower than the vapor pressure of the foaming agent, thereby causing the resin beads to be foamed and expanded.

The foaming agents used for obtaining the expanded beads include volatile foaming agents such as aliphatic hydrocarbons including propane, butane, pentane, hexane, heptane and the like, alicyclic hydrocarbons such as cyclobutane, cyclopentane and the like, halogenated hydrocarbons such as chlorofluoromethane, trifluoromethane, 1,1-difluoroethane, 1,2,2,2-tetrafluoroethane, methyl chloride, ethyl chloride, methylene chloride and the like, inorganic gaseous foaming agents such as nitrogen, carbon dioxide, argon, air and the like, and mixtures thereof. Of these, an inorganic gaseous foaming agent, which is free of breaking the ozone layer and inexpensive, is preferred. More preferably, nitrogen, air and carbon dioxide are used.

The amount of the foaming agent except nitrogen and air is generally in the range of 2~50 parts by weight per 100 parts by weight of the resin beads. When nitrogen or air is used as a foaming agent, the amount of the foaming agent is such that it is forced into a closed vessel within a pressure range of 20~60 $kgf/cm^2G$ immediately before commencement of expansion (or release). The amount or forcing amount of these foaming agents is appropriately selected depending on the relation with an expansion temperature of expanded beads to be obtained or the relation with the quantity of heat at a high temperature peak described hereinafter.

The dispersion medium for dispersing the resin beads includes, for example, water, ethylene glycol, glycerol, methanol, ethanol or the like, of those, there is usually used water, as long as the resin beads are not dissolved therein.

The dispersing agent, which is added to, if necessary, for dispersing the resin beads to a dispersion medium, includes finely divided aluminum oxide, titanium oxide, basic magnesium carbonate, basic zinc carbonate, calcium carbonate, kaolin, mica, clay or the like. Usually, these are added to the dispersion medium in an amount of 0.2~2 parts by weight per 100 parts by weight of the base resin.

The expanded polypropylene resin beads of the invention are prepared as stated hereinbefore by use of a metallocene PP copolymer as a base resin. For the production of the expanded polypropylene resin beads, the base resin may be composed of a mixture of the metallocene PP copolymer as a main component and other type of resin or elastomer as a sub-component in an amount within a range not impeding the effect of the invention.

Other types of resins capable of being mixed with the metallocene PP copolymer include, for example, polypropylene resins polymerized by use of the Ziegler-Natta catalyst or the like other than a metallocene polymerization catalyst, polyolefin resins such as, high-density polyethylene, linear low-density polyethylene, super low-density polyethylene, low-density polyethylene, ethylene-vinyl acetate copolymer, ethylene-acrylic ester copolymer, ethylene-acrylic acid copolymer, ethylene-methacrylic acid copolymer and the like, polystyrene resin, and other various types of thermoplastic resins.

The elastomers used by mixing with the metallocene PP copolymer include solid rubbers such as ethylene-propylene rubber, ethylene-1-butene rubber, propylene-1-butene rubber, styrene-butadiene rubber and hydrogenated products thereof, isoprene rubber, neoprene rubber, nitrile rubber, and the like, polystyrene elastomers such as styrene-butadiene block copolymer elastomers, hydrogenated products thereof, and the like, and other various types of elastomers.

The mixing amount of the sub-component stated above is generally in the range of less than 50 parts by weight per 100 parts by weight of the metallocene PP copolymer and preferably less than 30 parts by weight, and the mixing amount is appropriately controlled within a range not impeding the effect of the invention.

Various types of additives may be further formulated in the base resin. Examples of the additives include an antioxidant, a UV absorber, an antistatic agent, a flame retardant, a metal inactivating agent, a pigment, a dye, an inorganic material, a crystal nucleating agent and the like. These additives are mixed in amounts of 20 parts or less by weight per 100 parts by weight of the base resin, preferably 5 parts by weight or less, though depending on the physical properties required for a molded article obtained by molding of the expanded polypropylene resin beads in a mold. It will be noted that the inorganic material to be mixed with the base resin includes zinc borate, talc, calcium carbonate, borax, aluminum hydroxide or the like.

The mixing of such sub-component and additives as set out above with the metallocene PP copolymer is usually performed by mixing through melt kneading and, for example, by kneading at a desired temperature by use of a kneader such as rolls, a screw, a Banbury mixer, a kneader, a blender, a mill or the like.

The expanded polypropylene resin beads of the invention produced in a manner as stated before should preferably have a crystal structure wherein an inherent peak and a high temperature peak appear as an endothermic peak in the DSC curve obtained by subjecting the expanded beads to measurement by differential scanning calorimetry, and the high temperature peak has a quantity of heat of 10 J/g or over, more preferably 13 J/g or over. When the expanded polypropylene resin beads of the invention exhibits such a high temperature peak as having the quantity of heat specified above, the heat resistance of a molded article obtained by molding the expanded beads becomes better.

Figure 1:
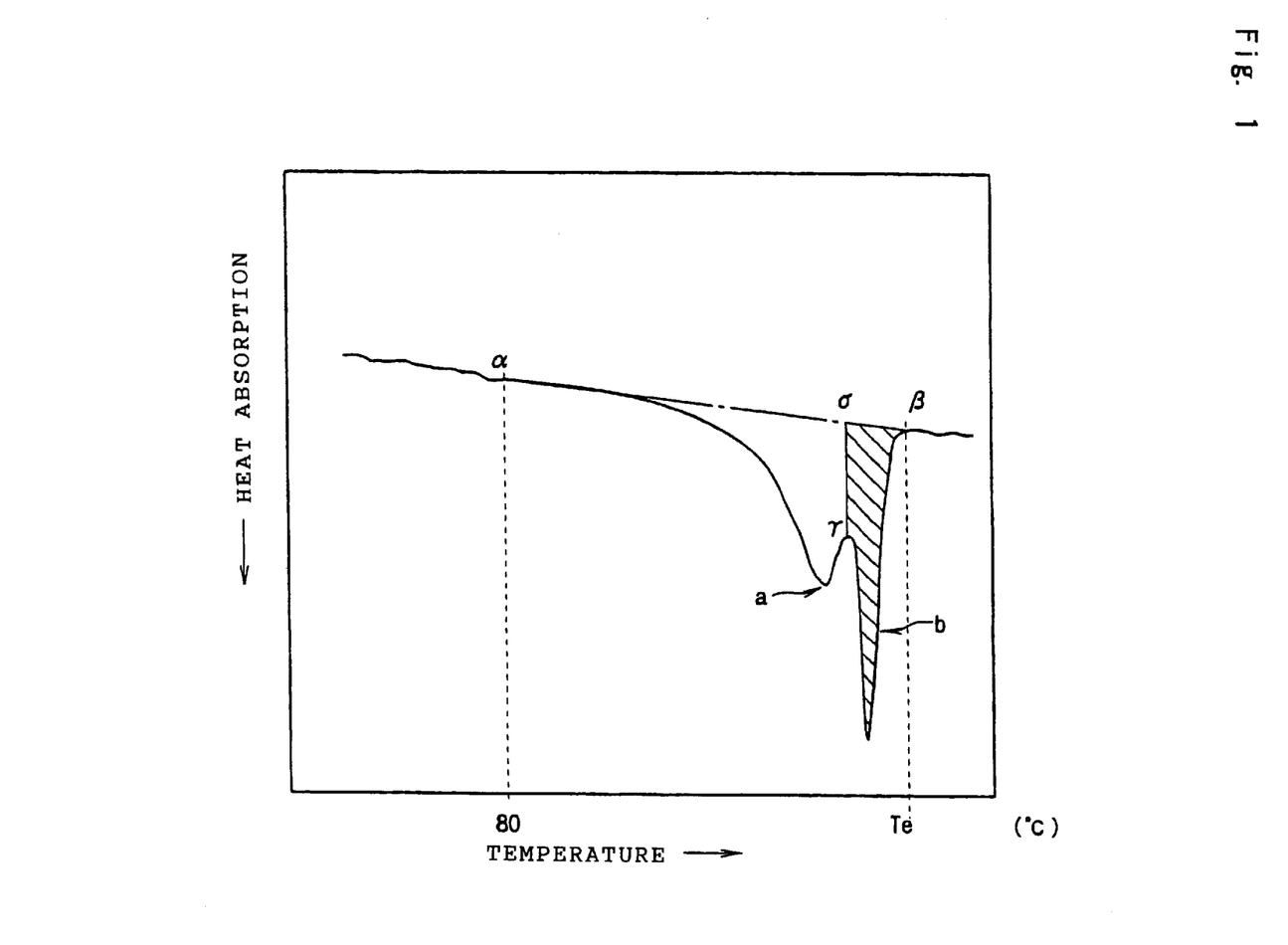
FIG. 1 is a view showing an example of a chart of a first DSC curve of expanded polypropylene resin beads.
Figure 2:
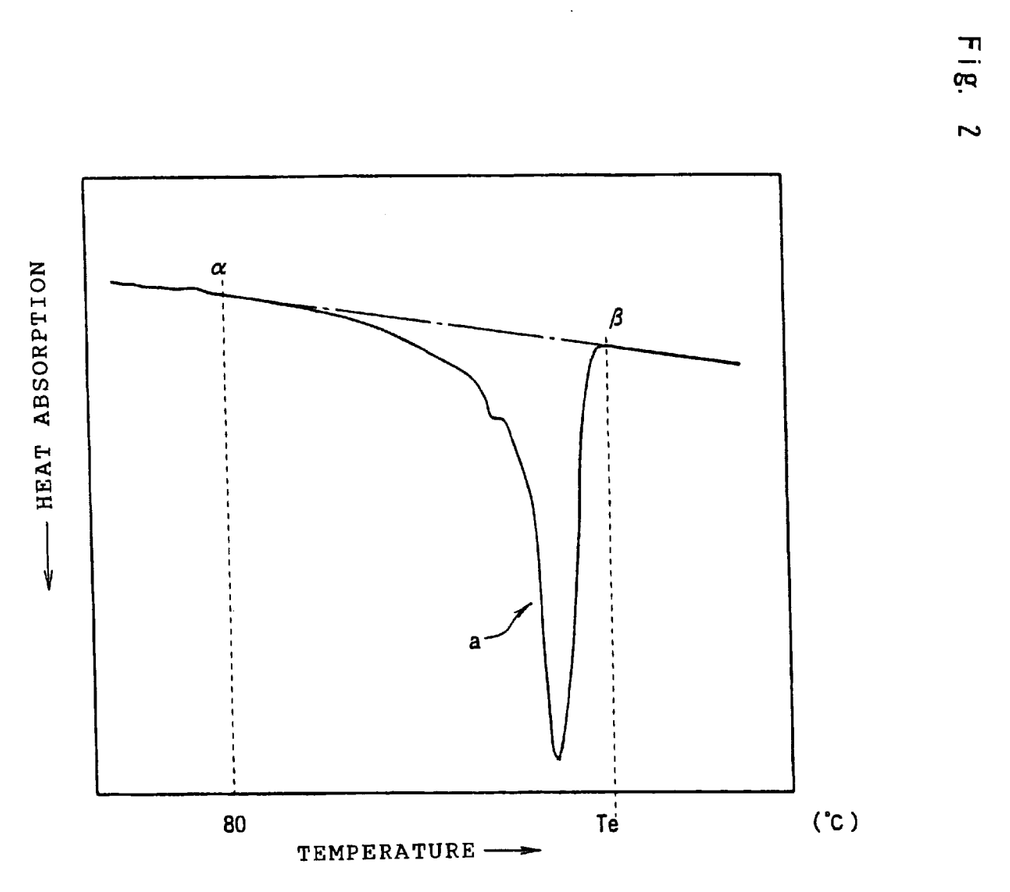
FIG. 2 is a view showing an example of a chart of a second DSC curve of the expanded polypropylene resin beads.

The DSC curve used herein, obtained by subjecting the expanded beads to measurement by differential scanning calorimetry is a first DSC curve which is obtained by heating 2–4 mg of the expanded beads at a heating rate of 10° C./minute up to 220° C. by means of a differential scanning calorimeter. The expanded polypropylene resin beads, which have such a crystal structure that an inherent peak and a high temperature peak appear as an endothermic peak in the DSC curve, have the following properties: when the DSC curve obtained by heating the expanded beads from room temperature to 220° C. at a heating rate of 10° C./minute is taken as a first DSC curve (its example is shown in FIG. 1) and the DSC curve obtained by subsequently cooling the beads from 220° C. to about 40° C. at a cooling rate of 10° C./minute and again heating to 220° C. at a heating rate of 10° C./minute is taken as a second DSC curve (its example is shown in FIG. 2), endothermic peaks a, b shown in FIG. 1 appear in the first DSC curve, of which the endothermic peak b appearing at a higher temperature side than the endothermic peak a appears only in the first DSC curve, but not in the second DSC curve.

The endothermic peak a appearing in both the first DSC curve and the second DSC curve depends on the absorption of heat at the time of so-called melting of the metallocene PP copolymer used as a base resin, and thus, is an endothermic peak inherent to the metallocene PP copolymer. Hereinafter, the endothermic peak a is referred to as an inherent peak, and the endothermic peak b is referred to as a high temperature peak, respectively.

The high temperature peak b appearing only in the first DSC curve depends on the crystal structure which differs from the crystal structure of expanded beads in which this peak does not appear.

More particularly, the inherent peak a appears in both the first DSC curve and the second DSC curve. In contrast, the high temperature peak b appears only in the first DSC curve but does not appear in the second DSC curve wherein the temperature is elevated under the same conditions. In view of this fact, it is considered that the crystal structure of the expanded beads wherein the high temperature peak b appears along with the inherent peak a is not ascribed to the crystal structure of the base resin per se, but is ascribed to a crystal structure which the expanded beads inherently has as the result of suffering the thermal history.

It is to be noted that the difference should favorably be great between the temperature at the top of the high temperature peak b appearing in the first DSC curve and the temperature at the top of the inherent peak a appearing in the second DSC curve and that the difference should preferably be 5° C. or over, more preferably 10° C. or over. In FIG. 1, there are depicted two endothermic peaks in the form of gentle curves. The DSC curve is not always limited to such a gentle curve, and a plurality of superposed endothermic peaks may appear in the chart, and as a whole, two endothermic peaks including the inherent peak and the high temperature peak may appear in the chart.

The high temperature peak b can be confirmed by comparison between the first DSC curve and the second DSC curve, and the quantity of heat at the high temperature peak b (hereinafter referred to as high temperature peak heat quantity) can be determined according to the following procedure.

First, a straight line is drawn by connecting between point α at 80° C. on the DSC curve and point β on the DSC curve indicating the completion temperature Te of melting the resin. Then, a line parallel to the ordinate of the graph is drawn from point γ on the DSC curve, which corresponds to a valley between the inherent peak a and the high temperature peak b, toward the straight line connecting the points α and β, and the intersection thereof is taken as point δ. The quantity of heat, which corresponds to the portion (i.e., a shaded portion in FIG. 1) surrounded by a straight line connecting points δ and β obtained in this way, a straight line connecting the points γ and δ and a curve connecting the points γ and β, is determined as the high temperature peak heat quantity.

The polypropylene resin expanded beads, which have such a crystal structure that there appear the inherent peak a and the high temperature peak b as an endothermic peak in the DSC curve whose high temperature peak heat quantity exhibit the specified value, can be obtained by controlling a heating retention temperature and a heating retention time prior to expansion and also controlling an expanding temperature for the production of the expanded beads.

More particularly, when the resin beads are heated within a closed vessel, the heating temperature is not raised to a melting completion temperature Te or over of the metallocene PP copolymer, and is held down at an arbitrary temperature Ta within a range of not lower than [melting point Tm−15° C.] to lower than the melting completion temperature Te, followed by keeping at the temperature Ta for an adequate time (preferably for approximately 10~60 minutes), thereafter the temperature is controlled at another arbitrary temperature Tb within a range of [melting point Tm−15° C.] to [melting completion temperature Te+5° C.], followed by keeping it at the temperature Tb for a further adequate time (preferably for 10~60 minutes), if necessary, to cause expansion. In this way, there can be obtained expanded beads having such a crystal structure as to permit the high temperature peak b to appear in the DSC curve. The magnitude of the high temperature peak heat quantity in the DSC curve of the expanded beads depends mainly on the temperature Ta applied to the resin beads and the retention time at the temperature Ta, the temperature Tb and the retention time at the temperature Tb, and the heating rate, all for the production of the expanded beads. The appropriate control of these parameters ensures that the high temperature peak heat quantity is at a specific value.

It will be noted that the temperature ranges illustrated above are those temperature ranges suitable for the case when an inorganic gaseous foaming agent is used as a foaming agent. Accordingly, when an organic volatile foaming agent is employed as a foaming agent, the appropriate temperature ranges will be, respectively, shifted to lower temperature sides than the above-mentioned temperature ranges, depending on the type and amount of foaming agent.

Figure 3:
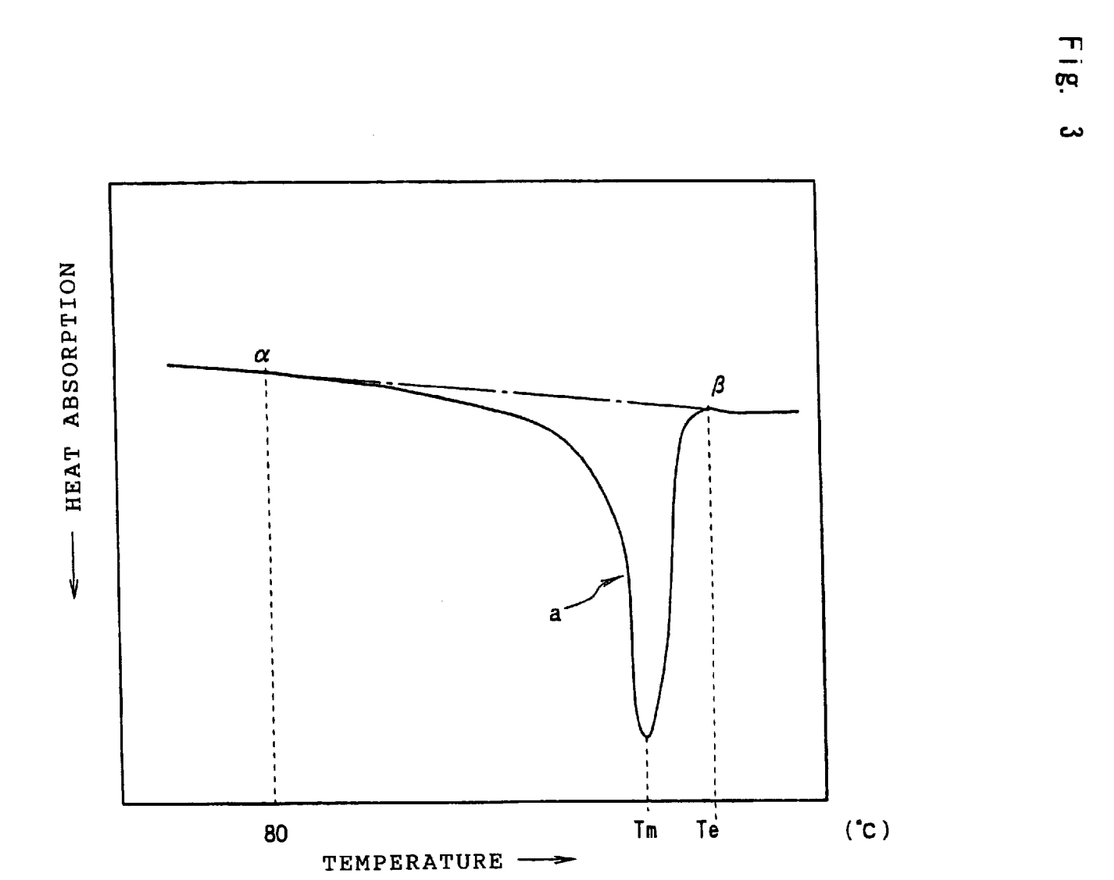
FIG. 3 is a view showing an example of a chart of a DSC curve of a base resin.

The melting point Tm of the metallocene PP copolymer used herein means a temperature at the top of the inherent peak a appearing in a second DSC curve (an example is shown in FIG. 3), which is obtained by providing 2~4 mg of a metallocene PP copolymer as a sample and subjecting it to measurement by differential scanning calorimetry of the metallocene PP copolymer in the same manner as the procedure of obtaining the DSC curve of the expanded beads set out hereinbefore. The melting completion temperature Te used herein means a temperature at the time when the foot of the inherent peak a is returned to the position of the base line at a higher temperature side.

Moreover, the melt flow rate (MFR) of the metallocene PP copolymer used herein is a value which is measured at 230° C. under a load of 2.16 kgf in a manner as described in JIS K 7210.

The molded article according to the invention is now described.

The molded article of the invention can be produced according to a batchwise molding process which comprises the steps of filling expanded polypropylene resin beads in a mold which is able to be heated and cooled and can be opened and closed and sealedly closed after increasing the inner pressure of cells, if necessary, feeding a steam at a vapor pressure of 3.0~6.0 kg/cm²G, heating the expanded beads in the mold until they are expanded and melt-fused, cooling the resultant melt and removing from the mold. Alternatively, the molded article of the invention may be produced according to a continuous molding process (molding processes described, for example, in Japanese Patent Application Laid-open Nos. Hei 9-104026, 9-104027 and 10-180888) which comprises the steps of continuously feeding the expanded polypropylene resin beads between belts continuously moving in a vertical direction in a passage after increasing the inner pressure of cells, if necessary, passing a heating zone wherein the expanded beads are mutually expanded and melt-fused, passing through a cooling zone for cooling, and removing the resultant molded article from the passage, cutting the molded article into a given length. It should be noted that for increasing the inner pressure of the cells in the expanded beads, the expanded beads are placed in a closed container and allowed to stand for an appropriate time under conditions where pressurized air is supplied to the container until the pressurized air is infiltrated into the expanded beads.

Although the thus obtained molded article of the invention makes use of a copolymer of propylene and an aolefin as a base resin, it exhibits a heat resistance better than a molded article of expanded beads made of homopolypropylene which exhibits a similar melting point and is polymerized by use of a metallocene polymerization catalyst, and is thus excellent in heat resistance.

The molded article of the invention preferably has the crystal structure that is able to develop an inherent peak and a high temperature peak as an endothermic peak in the DSC curve obtained by heating 2~4 mg of a sample piece cut off from the product at a heating rate of 10° C./minute up to 220° C. by means of a differential scanning calorimeter, and the high temperature peak has a quantity of heat of 10 J/g or over. If the molded article of the invention is so arranged as mentioned above, the heat resistance of the molded article becomes better.

The molded article provided with such a crystal structure wherein there appear an inherent peak and a high temperature peak as an endothermic peak in the DSC curve and the high temperature peak has a specified quantity of heat can be obtained by molding expanded beads wherein when the expanded beads are subjected to differential scanning calorimetry in a manner set out before, there appear an inherent peak and a high temperature peak in a first DSC curve, and the quantity of heat at the high temperature peak exhibits a specified value.

More particularly, when the expanded beads are produced under specified expanding conditions, such expanded beads are necessarily provided with a crystal structure which ensures the appearance of a high temperature peak having a specified quantity of heat in the DSC curve. Such a crystal structure of the expanded beads is not lost at the time of molding, and the molded article obtained by the molding has a similar crystal structure. Accordingly, when expanded beads, which are composed of the metallocene PP copolymer as a base resin, having such a crystal structure that permits an inherent peak and a high temperature peak to appear in the DSC curve obtained by the differential scanning calorimetric measurement wherein the high temperature peak heat quantity is 10 J/g or over, are molded, there can be obtained a molded article having a similar crystal structure and a similar high temperature peak heat quantity.

It should be noted that the high temperature peak heat quantity can be obtained from a first DSC curve of the molded article in the same procedure as the high temperature peak heat quantity of the expanded beads, and the resultant value is substantially equal to the high temperature peak heat quantity of the expanded beads used for molding.

The molded article of the invention is not only usable as an impact absorption material such as an automotive bumper core material or the like, but also favorably used as automotive interior materials integrated with a skin material such as a dashboard, a console box, a console lid, an instrument panel, a door panel, a door trim, a ceiling material, an interior material for pillar portion, a sun visor, an arm rest, a head rest and the like. Besides, the product has wide utility in the fields of a core material of a helmet, a heat insulating material, a structural material for ship or airplane, a cushioning material, and a building material. When the use in these fields is taken into account, the density of the molded article should preferably be 0.040 g/cm³ or over. The density smaller than 0.040 g/cm³ is not favorable because the impact absorbing properties become poor. The upper limit of the density is at about 0.45 g/cm³. If the density exceeds this value, the resultant molded article is unsuited for the above applications. For these reasons, the density of the molded article is more preferably 0.050~0.30 g/cm³ and most preferably 0.055~0.18 g/cm³.

The density of the molded article is calculated by determining a volume V (cm³) of the molded article from outer dimensions thereof and dividing a weight W (g) of the molded article by the volume V (cm³).

The invention is described in more detail by way of examples and comparative examples.

EXAMPLES 1~3

Metallocene copolymers obtained by subjecting propylene and a comonomer component indicated in Table 1 to random copolymerization was used as a base resin. The content of the comonomer component, the MFR and melting point (Tm) of the base resin are, respectively, shown in Table 1. Zinc borate (commercial name "Zinc Borate 2335" of Tomita Pharmaceutical Co., Ltd., used as a foaming aid) was added to the metallocene PP copolymer in an amount of 500 ppm, followed by melt kneading in an extruder and extruding the mixture from dies in the form of a strand. After quenching it in water, the strand was cut into a given length to obtain pellet-shaped beads (with a weight of about 2 mg per pellet).

1000 g of the thus obtained resin beads was dispersed in 3000 cc of water in a closed vessel (with a capacity of 5 liters), to which dry ice (amount of $CO_2$) was added as a foaming agent in amounts indicated in Table 1, along with further addition to the water, of 5 g of kaolin as a dispersing agent and 0.05 g of sodium dodecylbenzenesulfonate as a surface active agent. While agitating in the closed vessel, the mixture was heated to a heating retention temperature indicated in Table 1 without elevating the temperature to a level higher than the melting completion temperature Te of the base resin and kept for 15 minutes. Thereafter, the content was heated to an expansion temperature indicated in Table 1 without elevating the temperature to a level higher than the melting completion temperature Te of the base resin and kept for 15 minutes, followed by introduction of pressurized nitrogen to exert a back pressure +10 kg/cm$^2$ of an equilibrium vapor pressure of the foaming agent thereon and releasing the vessel at one end thereof while keeping the pressure. As a consequence, the resin beads and water were simultaneously released to cause the resin beads to be foamed and expanded to obtain expanded beads.

The resultant expanded beads were subjected to measurements of a high temperature peak heat quantity and a bulk density. The results of the measurements are shown in Table 1.

Next, the expanded beads were dried in an oven at 60° C. for 24 hours and filled in a mold (having dimensions of a molding space of 300 mm×300 mm×50 mm) which could be closed but not hermetically sealed without performing any procedure to increase inner pressure, followed by heating for molding with a steam of a saturated vapor pressure indicated in Table 1. After cooling, a molded article removed from the mold was dried in an oven at 60° C. for 24 hours to obtain a molded article as a molding product.

The thus obtained molded article was subjected to measurements of a high temperature peak heat quantity, a density and a degree of deflection at a high temperature. The results of the measurements are shown in Table 1.

COMPARATIVE EXAMPLES 1~3

Comparative Example 1 made use, as a base resin, of a metallocene PP copolymer obtained by random copolymerization of propylene and ethylene by use of a metallocene polymerization catalyst, Comparative Example 2 employed as a base resin homopolypropylene obtained by polymerization by use of a metallocene polymerization catalyst, and Comparative Example 3 made use, as a base resin, of a propylene ethylene random copolymer obtained by copolymerization by use of the Ziegler-Natta polymerization catalyst. These base.resins were used to prepare resin beads in the same manner as in Examples 1~3, respectively. The resultant resin beads were, respectively, expanded under expanding conditions indicated in Table 1 in the same manner as in Examples 1~3 to obtain expanded beads. The thus obtained expanded beads were subjected to measurements of a high temperature peak heat quantity and a bulk density. The results of the measurements are shown in Table 1.

Next, the expanded beads were, respectively, molded in the same manner as in Examples 1~3 using molding conditions indicated in Table 1, thereby obtaining molded articles.

The thus obtained molded articles were each subjected to measurements of a high temperature peak heat quantity, a density and a degree of deflection at a high temperature. The results of the measurements are shown in Table 1.

The methods of measuring the high temperature peak heat quantity and bulk density of the expanded beads of the examples and comparative examples, and the methods of measuring the high temperature peak heat quantity, density, degree of deflection at a high temperature of the molded articles are as follows.

(Method of measuring the high temperature peak heat quantity of expanded beads)

The expanded beads were subjected to measurement by differential scanning calorimetry to obtain a DSC curve as shown in FIG. 1, from which a quantity of heat corresponding to a portion (shaded portion in FIG. 1) surrounded by a straight line connecting points δ and β, a straight line connecting points γ and δ and a curve connecting points γ and β is calculated, and this value was taken as the high temperature peak heat quantity.

(Method of measuring the bulk density of expanded beads)

The bulk density of expanded beads were determined by providing a container having a capacity of 1000 cm$^3$ and provided with an opening at an upper portion thereof, filling expanded beads in the container under normal temperature and normal pressure conditions, removing expanded beads being over the opening of the container in order to coincide the bulk level of the expanded beads substantially with the opening, and dividing the weight of the expanded beads in the container in this condition by 1000 cm$^3$.

(Method of measuring a high temperature peak heat quantity of a molded article)

Determined in the same manner as in the method of measuring the high temperature peak heat quantity of expanded beads.

(Method of measuring a density of a molded article)

The density of the molded article was determined by obtaining a volume V (cm$^3$) from outer dimensions of a molded article, and dividing a weight W (g) of the molded article by the volume V (cm$^3$).

(Method of measuring a degree of deflection under high temperature conditions of a molded article)

Figure 4:
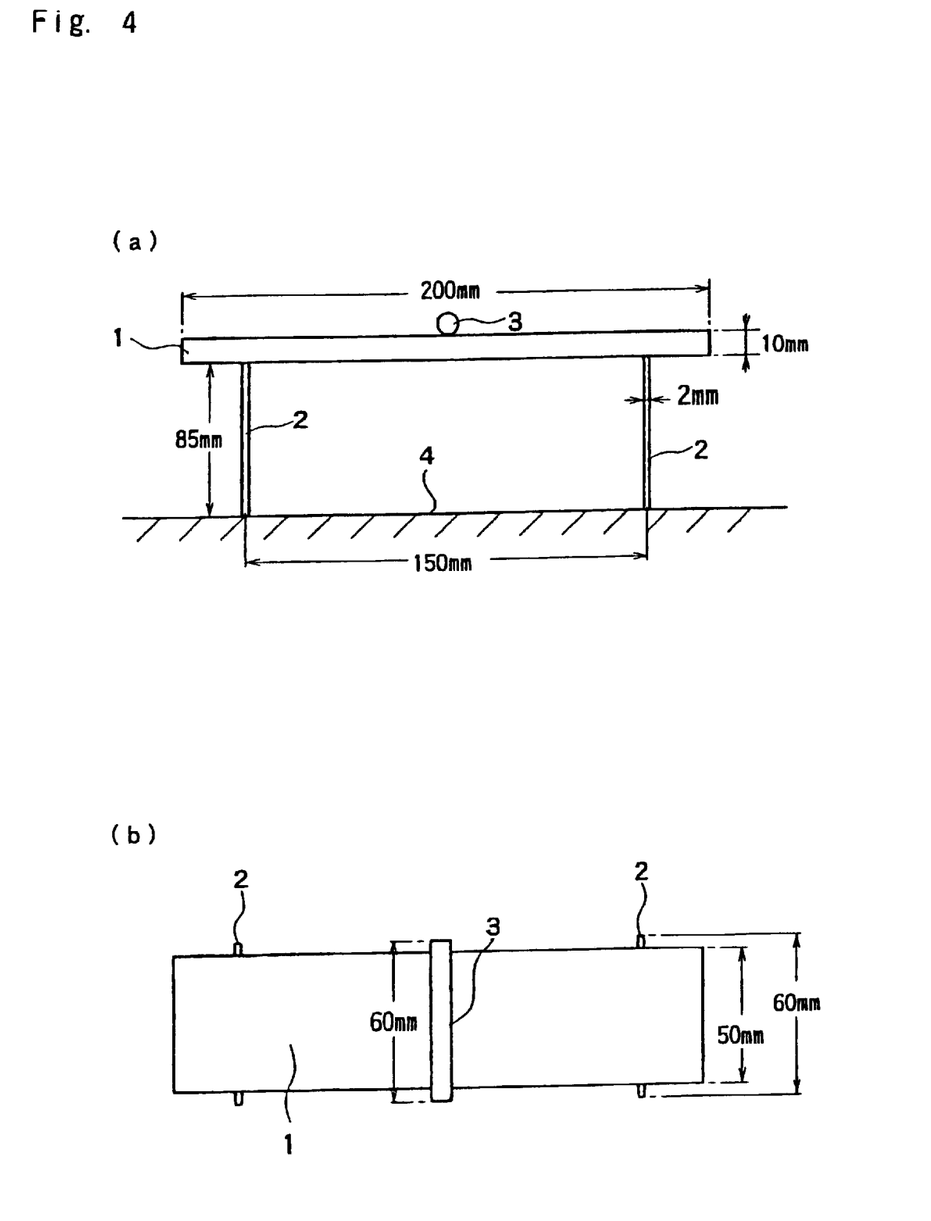
FIG. 4 is a top and side view illustrating a method of measuring a degree of high temperature deflection.

As shown in FIGS. 4(a) and (b), a test piece 1 cut off from a skin portion of a molded article and having a length of 200 mm, a width of 40 mm and a thickness of 10 mm was uniformly laid across two support plates 2, 2 each having a length of 85 mm, a width of 60 mm and a thickness of 2 mm, which stood vertically in parallel to each other so that the distance between the centers thereof was at 150 mm and wherein the upper edge thereof was rounded at a curvature radius=1 mm, in such a way that a surface corresponding to the molded article surface was turned upward and the lengthwise direction of the molded article was intersected at right angles with the support plates 2, 2. Subsequently, a column-shaped weight 3 (with a weight of 5 g) having a radius of 3 mm and a length of 60 mm was transversely disposed in parallel to the support plates 2,2 at a position on the test piece corresponding to the center between the two supports 2, 2 and allowed to stand in a temperature atmosphere of 130° C. for 22 hours. It is to be noted that FIG. 4(*a*) is a side view showing the state of the test piece 1 being disposed, and FIG. 4(*b*) is a plan view showing the state.

The degree (D) of deflection of the product under high temperature conditions is calculated according to the following equation.

$$D = L_1 - L_2$$

Wherein $L_2$ is the shortest distance between the lower surface of the test piece at a position corresponding to the central position between the support plates 2, 2 and the upper surface of a pedestal 4 having a horizontal face immediately after standing in the high temperature atmosphere over 22 hours, and $L_1$ is the shortest distance immediately before standing in the high temperature atmosphere. In the Examples, Comparative Examples and a reference appearing hereinafter, $L_1$ is at 85 mm in all the cases.

It will be seen that the molded articles obtained in Examples 1~3 are smaller in the degree of deflection suffering the load under heating conditions than the molded articles obtained in Comparative Examples 1~3. For better understanding, these results are analyzed as below.

In Example 2 and Comparative Example 1, the same types of metallocene PP copolymers are used as a base resin, respectively. In Example 2, there is used a metallocene PP copolymer which has substantially the same melting point as that of Comparative Example 1, but its MFR is smaller, thereby obtaining the molded article having a high temperature peak heat quantity very close to that of Comparative Example 1. Although the molded article of Example 2 is slightly smaller in density than the molded article of Comparative Example 1, so that the degree of deflection under the load at a high temperature would tend to be greater than that of the molded article of Comparative Example 1, the degree of deflection under the high temperature and loading conditions is, in fact, at a value which is below the half of the comparative example. From this, it will be seen that the molded article of the invention is excellent in heat resistance.

Example 1 deals with the use of the metallocene PP copolymer as a base resin, and Comparative Example 3 makes use, as a base resin, of the propylene-ethylene random copolymer polymerized by use of the Ziegler-Natta catalyst and having substantially the same melting point. Although the molded article of Example 1 is slightly smaller in density than the molded article of Comparative Example 3 with the possible tendency that the degree of deflection under high temperature and loading conditions would become larger than that of the molded article of Comparative Example 3, the degree of deflection under high temperature and loading conditions is at a value which is the half of the comparative example. Thus, it will be seen that the molded article of the invention is excellent in heat resistance.

Example 2 deals with the use of the metallocene PP copolymer, and Comparative Example 2 makes use, as a base resin, of the homopolypropylene polymerized by use of the metallocene catalyst. In Example 2, there is obtained the molded article from the copolymer having substantially the same melting point as in Comparative example 2. Although the molded article of Example 2 is slightly smaller in density than the molded article of Comparative Example 2 and is also smaller in the quantity of heat for melting at a high temperature peak, with the possible tendency that the degree of deflection under high temperature and loading conditions would become larger than that of the molded article of Comparative Example 2, the degree of deflection under the high temperature and loading conditions is at a value smaller than that of the molded article of Comparative Example 2. Thus, it will be seen that the molded article of the invention is excellent in heat resistance.

TABLE 1

| | | | Base Resin | | | Expanded Conditions | | |
|---|---|---|---|---|---|---|---|---|
| | | Comonomer Component | Content of Comonomer Component (wt %) | MFR (g/10 min) | Tm (° C.) | Amount of $CO_2$ (g) | Heating Retention Temperature (° C.) | Expanding Temperature (° C.) |
| Example | 1 | Ethylene | 0.5 | 3.3 | 149.4 | 40 | 149 | 154 |
| | 2 | Ethylene | 0.5 | 3.3 | 149.4 | 40 | 149 | 154 |
| | 3 | Ethylene | 1.0 | 9.8 | 147.2 | 50 | 144.5 | 149.5 |
| Comparative Example | 1 | Ethylene | 0.5 | 15.4 | 149.7 | 30 | 149 | 154 |
| | 2 | — | — | 18 | 149.8 | 45 | 148 | 153 |
| | 3 | Ethylene | 2.1 | 10 | 149.6 | 30 | 150 | 155 |

| | | Expanded Beads | | Molding | Molded Article | | |
|---|---|---|---|---|---|---|---|
| | | High Temperature Peak Heat Quantity (J/g) | Bulk Density (g/cm³) | Conditions Saturated Vapor Pressure (kg/cm²G) | High Temperature Peak Heat Quantity (J/g) | Density (g/cm³) | Degree of Deflection (mm) |
| Example | 1 | 20 | 0.064 | 4.4 | 20 | 0.082 | 2.0 |
| | 2 | 16 | 0.061 | 4.0 | 16 | 0.069 | 2.0 |
| | 3 | 26 | 0.085 | 4.6 | 26 | 0.10 | 3.6 |
| Comparative Example | 1 | 14 | 0.068 | 3.2 | 14 | 0.075 | 5.5 |
| | 2 | 28 | 0.069 | 4.7 | 28 | 0.075 | 3.6 |
| | 3 | 22 | 0.082 | 4.0 | 22 | 0.090 | 4.0 |

Industrial Utility

The expanded polypropylene resin beads of the invention have good moldability and are useful as a molding material for producing a molded article.

The molded article of the invention can be conveniently used as an impact absorbing material such as an automotive bumper core material or the like, an automotive interior material such as a dashboard of automobiles, and a heat insulating material.

What is claimed is:

1. Expanded propylene resin beads which comprise, as a base resin, more than 50% by weight of isotactic random propylene copolymer resin obtained by copolymerizing propylene and at least one comonomer selected from the group consisting of ethylene and α-olefins having four or more carbon atoms, in the presence of a metallocene polymerization catalyst, wherein said isotactic random propylene copolymer resin has a melting point in the range of from 141° C. to 160° C. and a melt flow rate of not more than 12 g/10 minutes.

2. Expanded propylene resin beads according to claim 1, wherein the content of said at least one comonomer in said isotactic random propylene copolymer resin is in the range of from about 0.05 to 15 wt %.

3. Expanded propylene resin beads according to claim 1, wherein said expanded beads have a crystal structure such that, when said beads are subjected to measurement by differential scanning calorimetry to obtain a DSC curve, there appear an inherent peak and a high temperature peak as an endothermic peak in the DSC curve, wherein the high temperature peak is a peak appearing at a higher temperature side than the inherent peak among the endothermic peaks in the DSC curve obtained when 2 to 4 mg of the expanded beads is heated to 220° C. at a heating rate of 10° C./minute, and wherein a quantity of heat at the high temperature peak is at least 10 J/g.

4. Expanded propylene resin beads according to claim 1, wherein said isotactic random propylene copolymer resin has a melting point in the range of from 141° C. to 155° C.

5. Expanded propylene resin beads according to claim 4, wherein said isotactic random propylene copolymer resin has a melt flow rate of from 0.5 to 12 g/10 minutes.

6. Expanded propylene resin beads according to claim 4, wherein said isotactic random propylene copolymer resin has a melt flow rate of from 4 to 10 g/10 minutes.

7. Expanded propylene resin beads according to claim 1, wherein said isotactic random propylene copolymer resin has a melt flow rate of from 0.5 to 12 g/10 minutes.

8. Expanded propylene resin beads according to claim 1, wherein said isotactic random propylene copolymer resin has a melt flow rate of from 4 to 10 g/10 minutes.

9. Expanded propylene resin beads according to claim 1, wherein said base resin comprises more than 70 wt. % of said isotactic random propylene copolymer resin.

10. Expanded propylene resin beads according to claim 1, wherein said base resin consists of said isotactic random propylene copolymer resin.

11. Expanded propylene resin beads according to claim 1, wherein the amount of said comonomer in said isotactic random propylene copolymer resin is from 0.1 to 10 wt. percent.

12. Expanded propylene resin beads which comprise, as a base resin, more than 70% by weight of isotactic random propylene copolymer resin copolymer obtained by copolymerizing propylene and from 0.1 to 10 wt. % of at least one comonomer selected from the group consisting of ethylene and α-olefins having four or more carbon atoms, in the presence of a metallocene polymerization catalyst, wherein said isotactic random propylene copolymer resin has a melting point in the range of from 141° C. to 155° C. and a melt flow rate of from 0.5 to 10 g/10 minutes.

13. A molded article obtained by subjecting, to molding, the expanded propylene resin beads as set forth in claim 1 or claim 12.

14. The molded article according to claim 13, further characterized by a crystal structure such that when said molded article is subjected to measurement by differential scanning calorimetry to obtain a DSC curve, there appear an inherent peak and a high temperature peak as an endothermic peak in the DSC curve, wherein the high temperature peak is a peak appearing at a higher temperature side than the inherent peak among the endothermic peaks in the DSC curve obtained when 2 to 4 mg of the sample piece is heated to 220° C. at a heating rate of 10° C./minute, and wherein a quantity of heat at the high temperature peak being is at least 10 J/g.

15. The molded article according to claim 13 or claim 14, having a density of at least 0.040 g/cm$^3$.

16. The molded article according to claim 15, wherein said density is in the range of from 0.050 to 0.30 g/cm$^3$.

17. The molded article according to claim 15, further characterized by a degree of deflection of not more than about 3.6 mm.

18. The molded article according to claim 15, further characterized by a degree of deflection which is lower than the degree of deflection of a molded article formed by molding expanded resin beads comprised of a base resin comprising random propylene copolymer resin and having substantially the same monomer composition and melting point as the expanded propylene resin beads comprising said isotactic random propylene copolymer resin, but obtained by copolymerizing propylene and at least one of ethylene and α-olefin having from 4 to 20 carbon atoms using a non-metallocene Ziegler-Natta catalyst.

19. The molded article according to claim 13, having a density of at least 0.040 g/cm$^3$.

20. The molded article according to claim 19, having a density in the range of from 0.050 to 0.30 g/cm$^3$.

21. The molded article according to claim 19, further characterized by a degree of deflection of not more than 3.6 mm.

* * * * *